June 9, 1953 A. H. DICKINSON 2,641,706

CONTROLLABLE MULTIVIBRATOR CIRCUIT

Filed June 23, 1949 3 Sheets-Sheet 1

INVENTOR
ARTHUR H. DICKINSON
BY
Charles E. McTiernan
AGENT

June 9, 1953 A. H. DICKINSON 2,641,706

CONTROLLABLE MULTIVIBRATOR CIRCUIT

Filed June 23, 1949 3 Sheets-Sheet 2

INVENTOR
ARTHUR H. DICKINSON
BY
Charles E. McTiernan
AGENT

INVENTOR
ARTHUR H. DICKINSON
BY Charles C. McTiernan
AGENT

Patented June 9, 1953 2,641,706

UNITED STATES PATENT OFFICE 2,641,706

CONTROLLABLE MULTIVIBRATOR CIRCUIT

Arthur H. Dickinson, Greenwich, Conn., assignor to International Business Machines Corporation, New York, N. Y., a corporation of New York Application June 23, 1949, Serial No. 100,803

2 Claims. (Cl. 250—36)

This invention pertains generally to oscillators and more specifically to a circuit arrangement for controlling the frequency of an oscillator.

The main object of the invention is to provide an oscillator circuit having a frequency which varies linearly with respect to a plurality of varying forces.

Another object of the invention is to provide a multivibrator circuit having a frequency which varies linearly with respect to an algebraic summation of a plurality of varying forces.

Other objects of the invention will be pointed out in the following description and claims and illustrated in the accompanying drawings, which disclose, by way of example, the principle of the invention and the best mode, which has been contemplated, of applying that principle.

Figure 2:
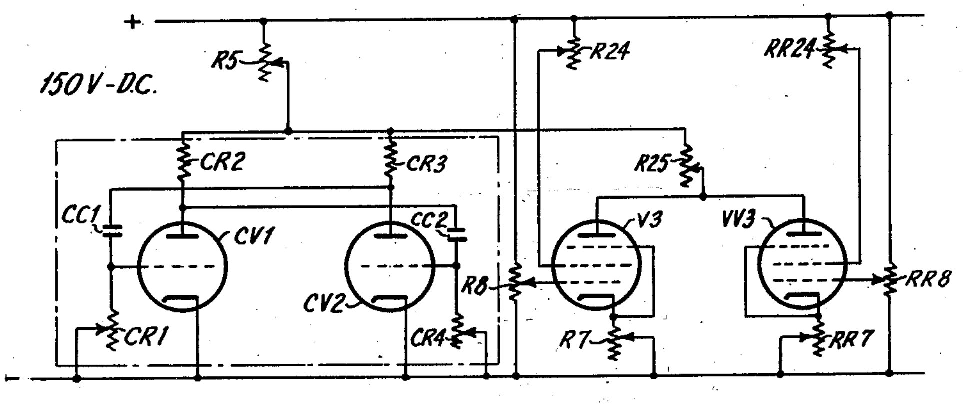
Fig. 2 represents a circuit diagram of the main embodiment of the invention whereby a plurality of unknown quantities are algebraically added and then applied to the multivibrator circuit thereby reducing a linear change in the frequency thereof.
Figure 2A:
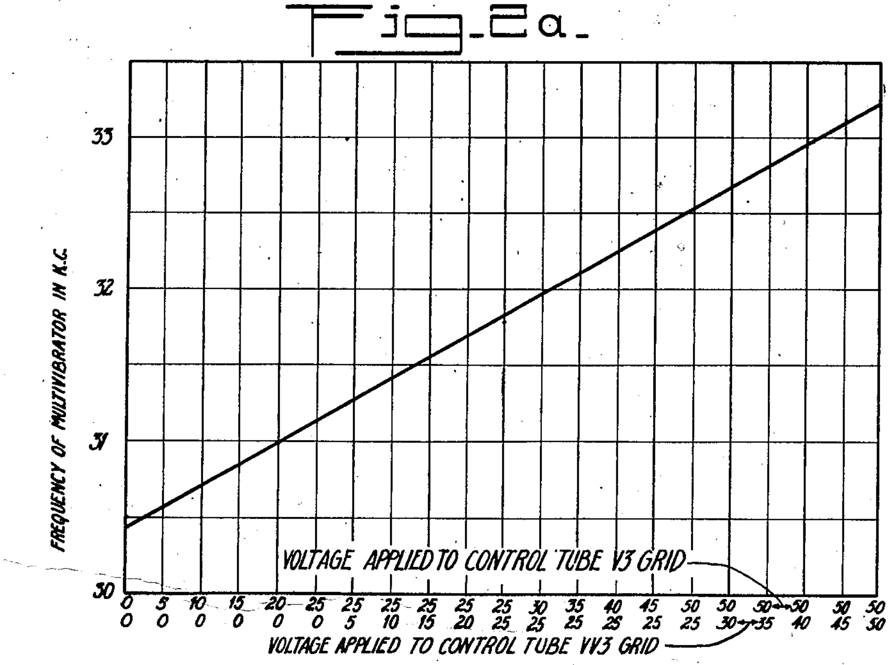

Fig. 2*a* is a curve showing the linear relationship existing between the frequency of the multivibrator and the summation of the varying unknown forces.

Figure 3:
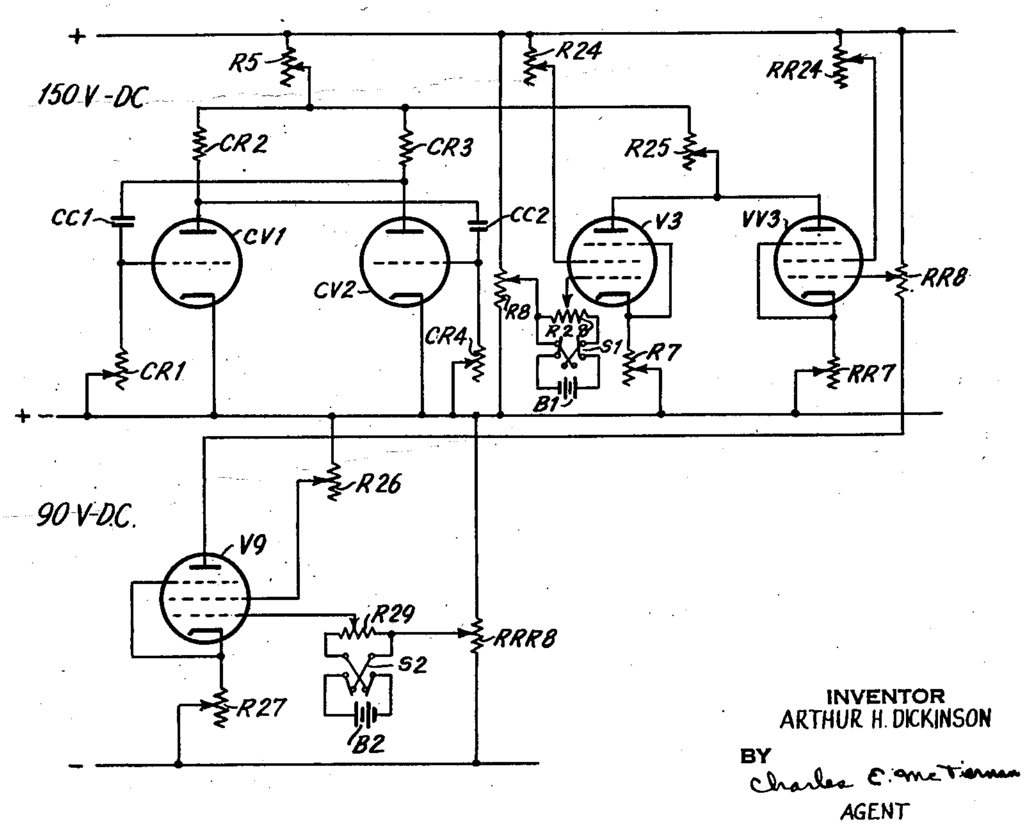

Fig. 3 represents a circuit diagram of a modification of the invention whereby a plurality of unknown forces each operated upon by a constant force or conversion factor are algebraically added and applied to the multivibrator circuit thereby inducing a linear change in the frequency thereof.

Figure 3A:
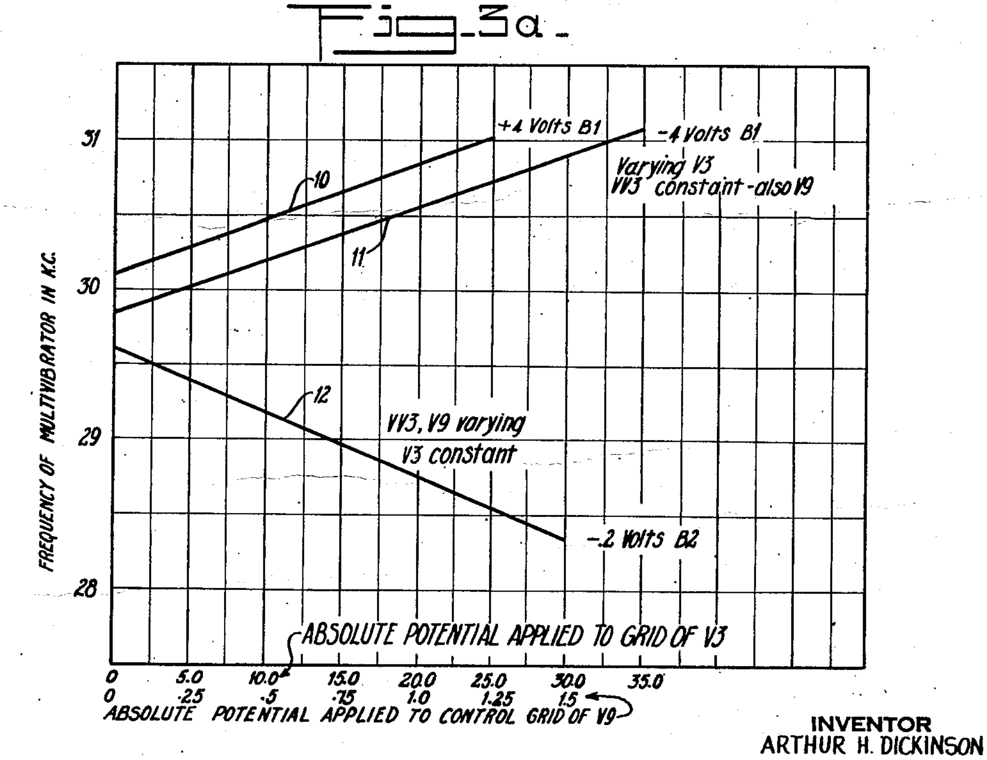

Fig. 3*a* is a series of curves showing the linear relationship existing between the frequency of the multivibrator and the plurality of unknown forces for different conditions of operation.

Figure 1:
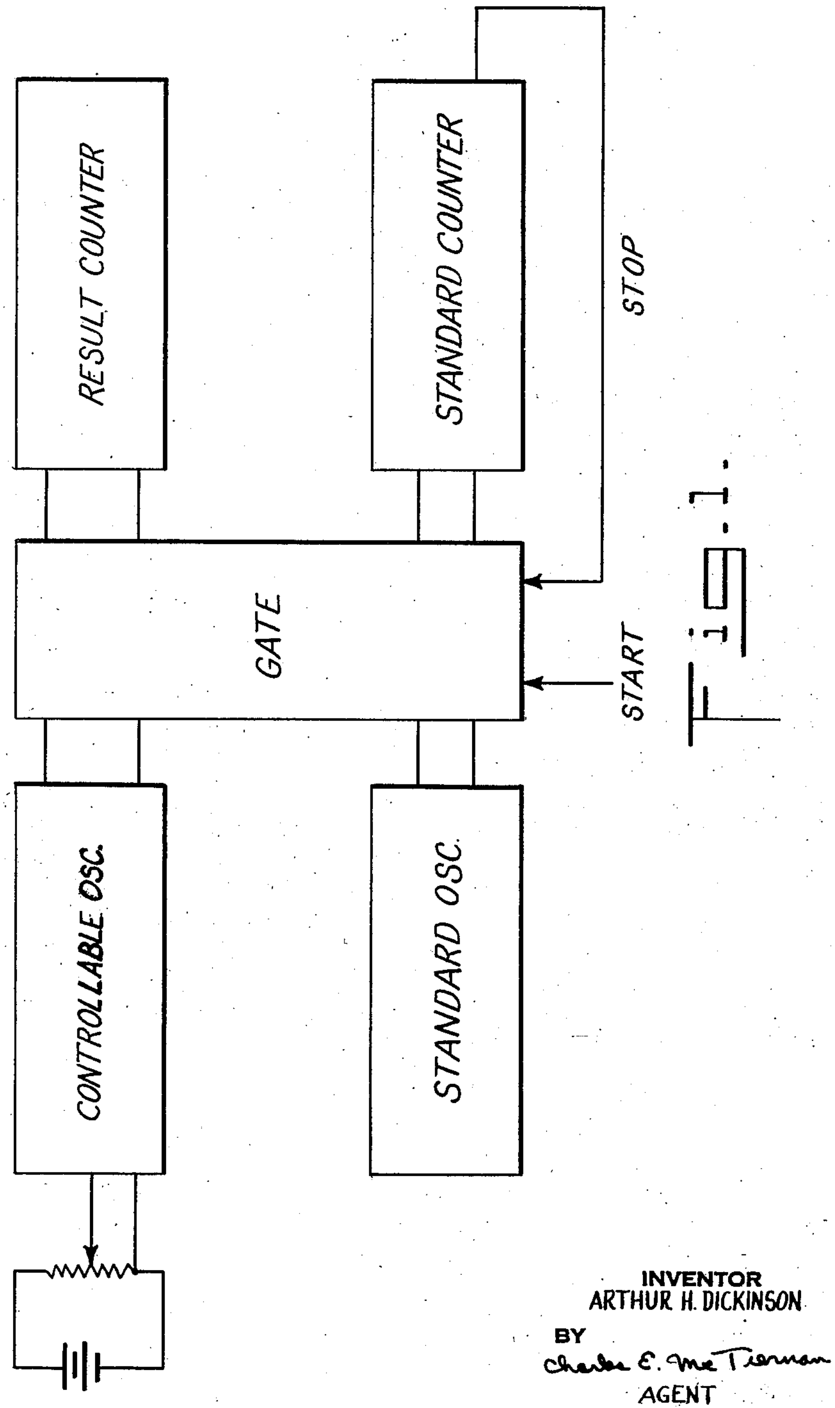
Fig. 1 represents a complete system wherein the invention may be an element thereof and in respect of which the principles of the invention can conveniently be explained.

In the copending application Serial No. 114,321, filed September 7, 1949, there is disclosed and claimed a complete system such as shown in Fig. 1, of the kind with which the present invention could be used. In the operation of the aforementioned system a quantity having a varying unknown magnitude is applied to the controllable oscillator in the form of a change in potential whereby the frequency thereof varies linearly with respect to the change in the magnitude. This change in frequency of the controllable oscillator is applied to the result counter where, after a predetermined time as determined by the fixed oscillator and the standard counter associated therewith, there is manifested in the result counter the value of the unknown magnitude in digital form.

The controllable oscillator circuit as described and claimed herein enables the resultant of a plurality of unknown quantities or forces to be determined by combining the quantities algebraically and then applying the results thereof to the oscillator, thereby inducing a linear change in the frequency of the oscillator. The change in the frequency of the oscillator is applied to the result counter in the manner such as set forth in the aforementioned copending application whereby the resultant force of the unknown forces is manifested. The oscillator circuit of the invention also permits each of the undetermined forces to be modified by a constant force or a conversion factor whichever is essential to arriving at the proper solution.

Referring to Fig. 1 there is set forth therein a complete system as disclosed in the aforementioned copending application wherein the invention disclosed herein may be employed. The system comprises a controllable oscillator having a frequency which varies linearly with respect to an unknown quantity, as represented by the potentiometer in Fig. 1, and which is applied to a result electronic counter, and a fixed frequency oscillator supplying a standard electronic counter with a normally blocked gating circuit inserted between each of the oscillators and the respective counter thereof. Upon the unblocking of the gating circuit, a measuring cycle is initiated whereby the output of each of the oscillators is applied to the electronic counter associated therewith. After a predetermined count has been entered into the standard counter the measuring cycle is terminated. The results appearing in the result counter at the end of the cycle is the digital value of the unknown magnitude.

The main embodiment of the invention wherein the frequency of the controllable oscillator varies linearly with respect to a plurality of forces is shown in Fig. 2. In this embodiment of the invention, the unknown quantities or forces are algebraically added according to the mathematical expression $(\pm A)+(\pm B)=\pm R$ where A and B are variable forces and R is the resultant non-digital quantity which is applied to the controllable oscillator circuit in the form of a resultant potential. The circuit arrangement of Fig. 2 comprises a pair of electron discharge devices or tubes CV1 and CV2 which are shown as a pair of triodes but which could also be a pair of pentodes without departing from the scope of the invention. The anode of each device is coupled to the positive side of the main power supply system through the plate resistors CR2 and CR3, respectively, which are adjustably coupled to the common resistor R5 having one end thereof connected to the positive side of the power supply.

The anode of the device or electronic tube CV2 is coupled to the control grid of the device or tube CV1 through the capacitor CC1. The anode of the tube CV1 is coupled to the control grid of the tube CV2 through the capacitor CC2.

The grid bias of each tube is normally maintained at a zero value by having the cathode of each device connected to the negative side of the power supply system while the grid of each device is adjustably coupled through the respective resistors CR1 and CR4 to the negative side of the power supply.

An adjustable voltage drop as provided by the adjustable resistor R25, the control electron discharge devices or tubes V3 and VV3 and the resistors R7 and RR7 is applied to the resistor R5 whereby the oscillator frequency is made to vary in a linear relationship. The tubes V3 and VV3 each have an anode, a suppressor grid coupled to the cathode, a screen grid connected to the high side of the power supply system by means of a movable contact on the resistors R24 and RR24, respectively, and a control grid. The cathodes of the tubes V3 and VV3 are respectively connected to the resistors R7 and RR7 which are in turn coupled to the negative side of the power supply by means of a movable contact arm. The anodes of V3 and VV3 are commonly connected together and coupled to the resistor R25 by a movable wiper with the resistor R25 connected, in turn, to the junction of the anode resistors CR2 and CR3. The resistors R8 and RR8, which are connected between the positive and negative side of the power supply, are coupled to the respective control grid of the tubes V3 and VV3. The resistors R8 and RR8 are illustrative only of sources of absolute voltage which would be produced by two varying quantities, the resultant magnitude of which is to be determined. While only two sources of absolute voltage are illustrated, it should be noted that the principles of the invention may be applied when the plurality of individual forces exceeds two. While the tubes CV1 and CV2 are shown as triodes and the tubes V3 and VV3 are shown as pentodes it will be understood that the invention is not limited thereto.

That part of the circuit of Fig. 2 which is beyond the portion of the circuit enclosed within the dashed lines constitutes the means for producing an algebraic summation of forces as represented by electrical potentials. If from this remaining portion either of the tubes V3 or VV3, in addition to the elements associated therewith, are removed then the rate of change of the anode circuit of the remaining tube with respect to the absolute voltage applied to the control grid thereof is a constant principally because the anode current in a pentode is independent of the anode voltage. Upon returning the removed tube to the circuit the operation of the circuit is such that the anode current through the tube V3 is independent of the anode current flowing through the device VV3. As a result, the total current flow through the resistors R5 and R25 is the sum of the anode currents through the tubes V3 and VV3 related in a manner such that the rate of change of the total anode current with respect to the sum of the absolute grid voltages is a constant. The change in the total anode current affects the frequency of the multivibrator circuit in a manner to bring about a relationship between the absolute grid voltage and the frequency of the circuit such that the rate of change of the frequency of the oscillator circuit with respect to the sum of the absolute grid voltages is a constant.

Thus it is noted that the embodiment of the invention shown in Fig. 2 comprises a circuit arrangement whereby a plurality of forces, as represented by a like number of sources of variable potential, are combined to form a resultant force as represented by an adjustable voltage drop across the resistor R5. This voltage drop upon being injected into the oscillator circuit varies the frequency thereof accordingly. When the controllable oscillator is employed in the system of Fig. 1 and the change in frequency is entered in the result counter for a predetermined time, a digital manifestation of the resultant force may be obtained.

In Fig. 2*a* there is shown the linear relationship existing between the frequency of the controllable oscillator and the resultant of the potentials applied to the grid of the control tubes V3 and VV3. This graph shows that the linearity of the frequency variation is not effected when one potential, which represents an unknown quantity, is maintained at a constant value while the other potential, which represents another unknown quantity or force, is varied and for the reverse condition thereof.

In the modification of the invention shown in Fig. 3 there is shown therein a circuit arrangement for algebraically adding forces according to the mathematical expression $$(\pm A+\pm k_1)-(\pm B+\pm k_2)=\pm R$$

where A and B are variable forces or quantities $k_1$ and $k_2$ are constant forces, and $r$ is the resultant force.

The circuit of Fig. 3 is different from the circuit arrangement of Fig. 2 only as to that portion of the circuit which algebraically adds the plurality of forces with the multivibrator portion of the circuit remaining the same. Likewise, portions of the circuit of Fig. 3 which correspond in function to the circuit of Fig. 2 are assigned similar reference characters.

In Fig. 3 the grid voltage of the device V3 is supplied by the illustrative source R8, which is representative of a variable force or quantity in the form of an electrical potential. The potential derived from the resistor R8 is supplemented by a voltage derived from the resistor R28 to which is applied a potential from the battery B1. The constant known force or quantity which operates upon the undetermined varying force or quantity, or the conversion factor necessary to bring about the true results is entered into the circuit in the form of an electrical potential by adjusting the wiper arm riding upon the resistor R28 at some specified point. Once the wiper arm is adjusted the supplementary potential remains constant thereby supplying the value $k_1$ in the above equation. The position of the switch S1, which is located intermediate the resistor R28 and the battery B1, determines whether the supplementary potential is added to or subtracted from the potential supplied by the resistor R8, which potential is represented by A in the above equation.

The second unknown force or quantity, which is to be combined with the first force, is illustrated as a source of potential which is derived from the resistor RRR8, which is connected across the positive and negative side of the bias power supply system and which is applied to the control grid of the tube V9. The voltage applied to the grid of the tube V9 is modified by a supplementary voltage which is derived from the resistor R29 to which is applied a potential from the battery B2. This supplementary voltage, which represents the value $k_2$ in the above equation, is adjusted by the movement of the wiper arm which rides upon the resistor R29 to a value representing a constant quantity which operates upon the second unknown quantity. The position of the switch S2 determines whether the supplementary voltage will be added to or subtracted from the potential supplied by the resistor RRR8, which potential represents the factor B in the above equation.

The electron discharge device or tube V9 has a cathode which is connected to the low side of the bias power supply through the adjustable resistor R27 and which is also coupled to the suppressor grid thereof, a screen grid which is connected to the high side of the bias power supply through the adjustable resistor R26, a control grid to which the potentials from the resistor RRR8 and B2 are applied, and an anode. The anode of the tube V9 is coupled to the high side of the main power supply system through the resistor RR8 which is slidably coupled to the control grid of the tube VV3. The anode of the tube VV3 is commonly coupled with the anode of the electron discharge device V3 to the resistor R25 which is, in turn, connected to the multivibrator circuit similar to the circuit arrangement of Fig. 2.

Thus it is to be noted that as the absolute voltage applied to the control grid of the tube V9 increases, the current flow through V9 also increases resulting in an increase in the voltage drop across the resistor RR8. Inasmuch as the control grid of the tube VV3 is coupled to the resistor RR8, a voltage drop across RR8 results in a decrease in the grid voltage applied to the tube VV3 such that the rate of change of the grid voltage applied to VV3 with respect to the absolute voltage applied to the control grid of the tube V9 is a constant.

In the case of the tube V3, an increase in the absolute voltage applied to the grid of V3 increases the current flow through the resistors R5 and R25, the tube V3 and the resistor R7 while an increase of the absolute voltage applied to the control grid of the tube V9 decreases the current flow through the resistors R5 and R25, the tube VV3 and the resistor RR7. Thus the action of the tube VV3 opposes that of the tube V3 resulting in the force represented by the resistor RRR8 being subtracted from the force represented by the resistor R8. The resultant force, in the form of an electrical potential, appears as a voltage drop across the resistor R5 which drop upon being injected into the multivibrator circuit varies the frequency thereof in a linear fashion.

In Fig. 3*a* there is shown the linear relationship existing between the frequency of the multivibrator and the absolute voltage which is applied to the control tubes V3 and V9 for different conditions of operation. The graphical representation 10 shows the linearity of the frequency change obtained when one unknown quantity, as represented by R8, is varied while the second unknown magnitude, as represented by a potential obtained from RRR8, is maintained at a constant value with the varying potential obtained from R8 being added to by a constant potential, which represents a constant force or conversion factor, as supplied by the source B1. The curve 11 represents the same condition for the two unknown quantities but with the constant force or conversion factor, as represented by a fixed potential derived from the source B1, being subtracted from the varying magnitude. When the unknown magnitude which is applied to the tube V3 is maintained at a constant value and the second unknown quantity which is applied to the control tube V9 is varied with the constant force or conversion factor which operates upon the varying unknown magnitude so as to subtract from the value thereof, the result is a linear change in frequency as shown by the curve 12.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a circuit for obtaining the resultant potential of a plurality of variant quantities comprising a first source of varying potential representing one of said quantities, a first source of supplementing potential representing a constant quantity operating upon said one of said quantities, means operably coupled to said supplementing potential to control the effectiveness thereof with respect to said first source, a first electron discharge device comprising an anode, a cathode and a control grid, said first varying potential and said first supplementing potential being applied to the grid of said first device whereby the current flow thereof varies accordingly, a second source of varying potential representing another of said quantities, a second source of supplementing potential representing a constant quantity operating upon said another of said quantities, means operably coupled to said second supplementing potential to control the effectiveness thereof with respect to said second source, a second electron discharge device comprising an anode, a grid and a cathode, said second sources of varying potential and supplementing potential being applied to the grid of said second device whereby as the potential applied thereto varies there is a direct variation in current flow through said second device, a third electron discharge device, means coupling said second device to said third device such that said current flow through said second device induces an inverse change in said third device, means coupling said first and third devices to a common anode impedance across which a resultant potential equal to the difference between the output potential of said first and second devices may be derived.

2. In a circuit for obtaining the resultant potential of a plurality of variant quantities comprising a first source of varying potential representing one of said varying quantities, a first source of supplementing potential representing a constant quantity operating upon said one of said quantities, a first electron discharge means coupled to said potentials, the current of said first means varying directly with the variation of said first varying potential, a second source of varying potential representing the other of said varying quantities, a second source of supplementing potential representing a fixed quantity operating upon said other of said quantities, a second electron discharge means, means for applying said second sources of potential in an inverse relationship to said second means, the current of said second means varying inversely with the variation of said second varying potential, means for combining the output of said first and second means to produce a resultant potential whereby the output potential of said second means subtracts from the output potential of said first means.

ARTHUR H. DICKINSON.

References Cited in the file of this patent

UNITED STATES PATENTS

| Number | Name | Date |
|---|---|---|
| 2,338,395 | Bartelink | Jan. 4, 1944 |
| 2,365,512 | Bartelink | Dec. 19, 1944 |
| 2,404,250 | Rajchman | July 16, 1946 |
| 2,461,144 | Cook | Feb. 8, 1949 |
| 2,477,076 | Miller | July 26, 1949 |
| 2,487,603 | Scoles | Nov. 8, 1949 |